US011680627B2

(12) United States Patent
Seipold et al.

(10) Patent No.: US 11,680,627 B2
(45) Date of Patent: Jun. 20, 2023

(54) VARIABLE SPEED DRIVE FOR A GENERATOR

(71) Applicant: Caterpillar Inc., Peoria, IL (US)

(72) Inventors: John Seipold, Peoria, IL (US); Gaurav Vasudeva, Dunlap, IL (US); Evan Jacobson, Edwards, IL (US); Eric Manning, Eureka, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/585,666

(22) Filed: Jan. 27, 2022

(65) Prior Publication Data

US 2022/0145966 A1    May 12, 2022

Related U.S. Application Data

(63) Continuation of application No. 16/511,622, filed on Jul. 15, 2019, now Pat. No. 11,268,596.

(51) Int. Cl.
*F16H 3/44* (2006.01)
*H02K 7/18* (2006.01)
*H02K 7/116* (2006.01)
*F16H 47/04* (2006.01)
*F16H 39/42* (2006.01)

(52) U.S. Cl.
CPC ............... *F16H 3/44* (2013.01); *F16H 47/04* (2013.01); *H02K 7/116* (2013.01); *H02K 7/1815* (2013.01); *F16H 39/42* (2013.01); *F16H 2200/2005* (2013.01)

(58) Field of Classification Search
CPC ... F16H 3/44; F16H 3/72; F16H 47/04; F16H 2200/2005; F16H 39/42; H02K 7/1815; H02K 7/116
See application file for complete search history.

(56) References Cited

U.S. PATENT DOCUMENTS 4,259,881 A    4/1981   Meyerle
4,774,855 A   10/1988   Murrell et al.
(Continued)

FOREIGN PATENT DOCUMENTS

DE    102006044895 B4    1/2016
EP         0153612 A1    4/1988

OTHER PUBLICATIONS

International Search Report for Int'l. Patent Appln. No. PCT/US2020/041476, 3 pgs, (dated Sep. 24, 2020).
(Continued)

*Primary Examiner* — Timothy Hannon
(74) *Attorney, Agent, or Firm* — Harrity & Harrity, LLP

(57) ABSTRACT

A variable drive system of a power system is disclosed. The variable drive system may include an engine gearset to transfer power from an engine output of an engine to a variable input driveshaft of the variable drive system. The variable drive system may include a generator gearset to transfer power, generated by the engine, to a generator driveshaft of a generator. The variable drive system may include a variable drive, coupled to the variable input driveshaft, to enable a gear ratio between engine output and the generator driveshaft to be adjustable, the variable input driveshaft being offset from at least one of the engine output or the generator driveshaft. The variable drive system may include a direct drive clutch to bypass variable power transfer through the variable drive and enable direct power transfer from the engine output to the generator driveshaft.

20 Claims, 6 Drawing Sheets

(56) References Cited

U.S. PATENT DOCUMENTS

| | | | |
|---|---|---|---|
| 4,813,306 | A | 3/1989 | Kita |
| 6,561,940 | B2 | 5/2003 | Goi et al. |
| 7,374,506 | B2 | 5/2008 | Bucknor et al. |
| 8,465,387 | B2 | 6/2013 | Conlon |
| 9,487,073 | B2 | 11/2016 | Love et al. |
| 9,793,842 | B2 | 10/2017 | Pendray et al. |
| 9,897,182 | B2 | 2/2018 | Van Druten |
| 2002/0125723 | A1 | 9/2002 | Staalesen |
| 2005/0194787 | A1 | 9/2005 | Tilscher et al. |
| 2010/0109340 | A1 | 5/2010 | Storm et al. |
| 2011/0130235 | A1 | 6/2011 | Phillips |
| 2015/0057119 | A1 | 2/2015 | Jacobson |
| 2015/0292608 | A1 | 10/2015 | McKinzie |
| 2016/0017992 | A1 | 1/2016 | Lister |
| 2017/0292595 | A1 | 10/2017 | Bagusch |
| 2019/0170232 | A1 | 6/2019 | Strashny |
| 2020/0132179 | A1 | 4/2020 | Minami |
| 2021/0018071 | A1 | 1/2021 | Seipold et al. |

OTHER PUBLICATIONS

International Preliminary Report on Patentability and Written Opinion for Int'l. Patent Appln. No. PCT/US2020/041476, 7 pgs, (dated Jan. 18, 2022).

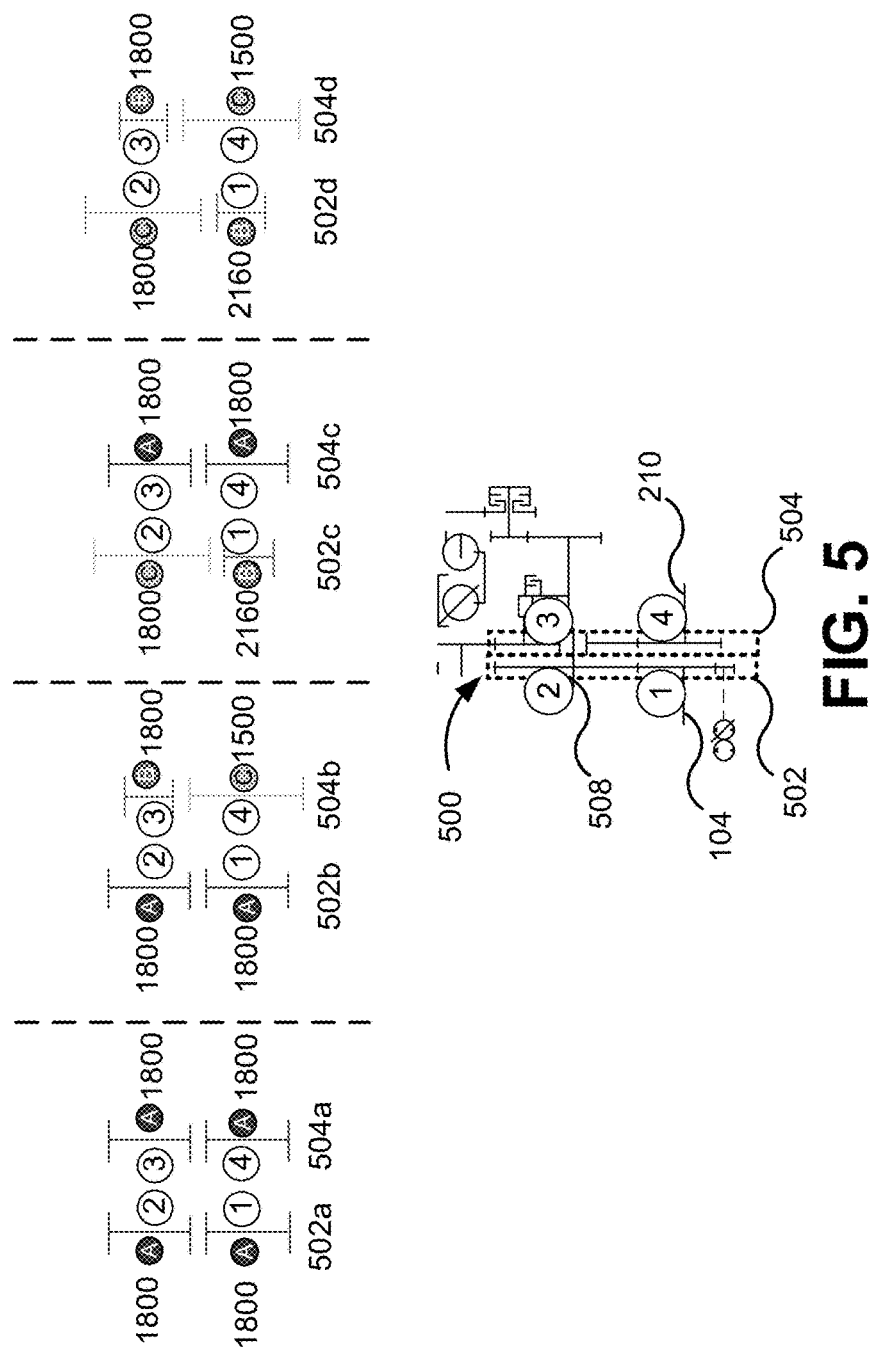

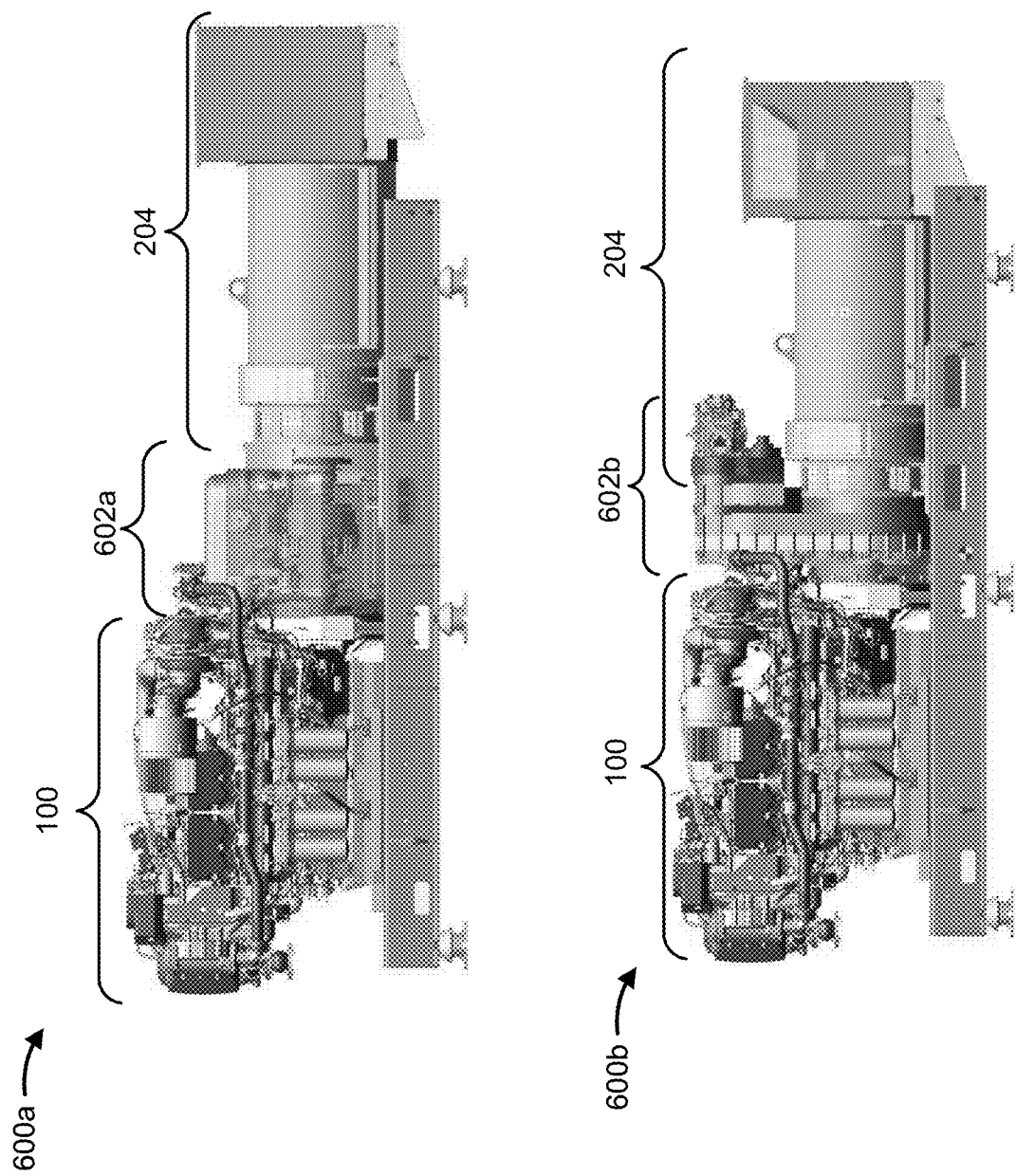

VARIABLE SPEED DRIVE FOR A GENERATOR

RELATED APPLICATION

This application is a continuation of U.S. patent application Ser. No. 16/511,622, filed Jul. 15, 2019, which is incorporated herein by reference in its entirety.

TECHNICAL FIELD

The present disclosure relates generally to power systems and, for example, to a power system with an engine and a generator.

BACKGROUND

In certain applications, a power system may include an alternating current (AC) generator (e.g., of an electrical generator set (genset)) powered by an internal combustion engine. Such a power system typically is operated at low load (e.g., less than 40% of load capability). However, because AC generators typically have to produce electricity at a specific frequency (e.g., 60 Hz in North America, 50 Hz in Europe, etc.), the engine must maintain a constant speed regardless of the load on the generator. However, engines running at high speed and light load are typically inefficient on fuel consumption. In some instances, this problem may be solved using an "Inverter Genset" that allows the engine to run at reduced speeds to match the power load but produces electricity at a wrong frequency. In such instances, an inverter (and/or other electronics devices) takes "dirty" AC power that is at the wrong frequency, converts the "dirty" AC power to DC power (eliminating the frequency domain), and then converts that DC power back into "clean" AC power that is at the desired frequency. However, such an inverter can be expensive and can consume a relatively large amount of accessible space near the generator, and such space can be limited for certain power systems (e.g., power systems that are to be included in an engine room of a marine vessel).

In some instances, additional components (e.g., fixed gears, epicyclic gears, and/or the like) may be added to the power system between the engine and the generator to assist with enabling variable engine speeds and maintaining a constant input speed to the generator. However, the more components that are added to the power system, the greater the number of possible parasitic penalties that reduce power of the power system and result in reducing an efficiency of the power system.

One attempt to provide an electrical generator with a constant rotational speed from a variable speed input is disclosed in U.S. Pat. No. 4,774,855 that issued to Murrell et al. on Oct. 4, 1988 ("the '855 patent"). In particular, the '855 patent discloses an electrical generator drive which comprises a power source able to transmit power at a rotational speed which may fluctuate substantially in service, an electrical generator which requires a rotational input of power at a substantially constant speed, and a controllable drive transmission of high rotational inertia coupling together the power source and the electrical generator.

While the controllable drive transmission of the '855 patent may provide an electrical generator with a constant rotational speed from a variable speed input, the controllable drive transmission may reduce the efficiency of the electric generator drive.

The variable drive system of the present disclosure solves one or more of the problems set forth above and/or other problems in the art.

SUMMARY

According to some implementations, a variable drive system of a power system may include an engine gearset to transfer power from an engine output of an engine to a variable input driveshaft of the variable drive system; a generator gearset to transfer power, generated by the engine, to a generator driveshaft of a generator; a variable drive, coupled to the variable input driveshaft, to enable a gear ratio between engine output and the generator driveshaft to be adjustable, the variable input driveshaft being offset from at least one of the engine output or the generator driveshaft; and a direct drive clutch to bypass variable power transfer through the variable drive and enable direct power transfer from the engine output to the generator driveshaft.

According to some implementations, a power system may include an engine; a generator aligned with the engine along an axial length of the power system; and a variable drive system comprising: an engine gearset to transfer power from an engine output of the engine to a variable input driveshaft of the variable drive system; a generator gearset to transfer power, generated by the engine, to a generator driveshaft of the generator; and a variable drive offset from the engine and the generator by being mechanically coupled between the engine gearset and the generator gearset to enable the axial length of the power system to satisfy a threshold length.

According to some implementations, a gearset assembly to transfer mechanical power from an engine to a generator in fixed positions of a power system may include an engine gearset comprising: a first fixed gear that is mechanically coupled to an engine output of the engine, and a second fixed gear that is driven by the first fixed gear and is mechanically coupled to a variable driveshaft associated with a variable drive mechanically coupled in the power system between the engine and the generator; and a generator gearset comprising: a third fixed gear that is driven by a fixed gear drive, and a fourth fixed gear that is driven by the third fixed gear and is mechanically coupled to a generator driveshaft of the generator.

BRIEF DESCRIPTION OF THE DRAWINGS

FIG. 5 is a diagram of one or more example implementations of gearsets of a variable drive system of the example power system of FIG. 2.

FIG. 6 is a diagram illustrating one or more example implementations of the power system of FIG. 2.

DETAILED DESCRIPTION

Figure 1:
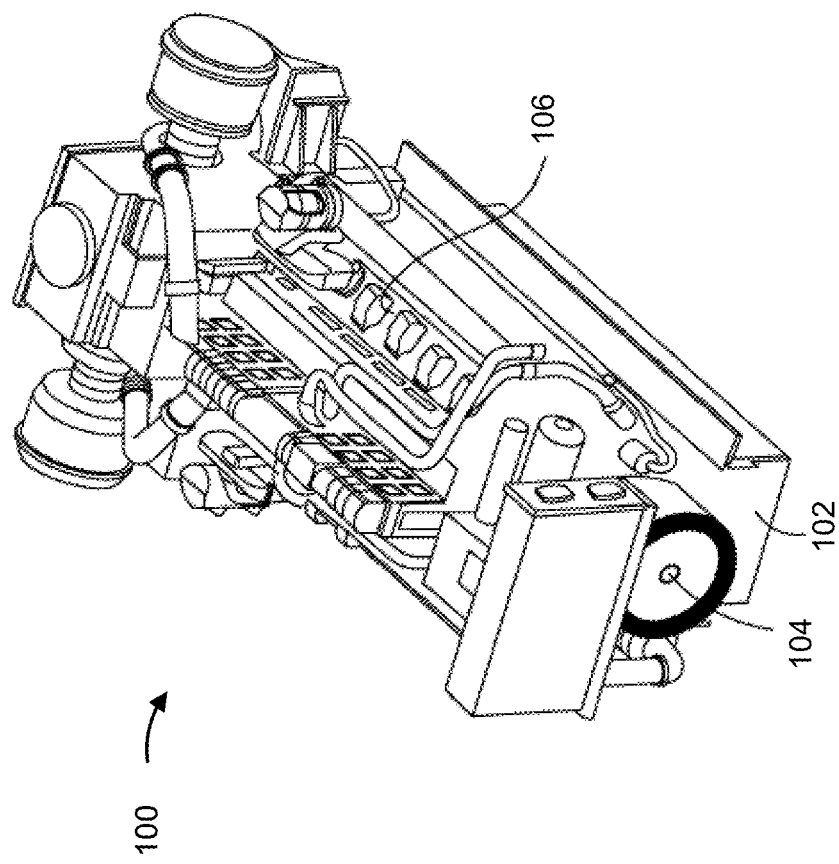
FIG. 1 is a diagram of an example implementation of an engine as described herein.

FIG. 1 is a diagram of an example implementation of an engine 100 described herein. Engine 100 may be an internal combustion engine powered by any fuel, such as natural gas, diesel, gasoline, and/or a combination thereof. Engine 100 may be employed by a machine (e.g., a vehicle, power generation equipment, transportation equipment, construction equipment, agriculture equipment, forestry equipment, aviation equipment, marine equipment, mining equipment, material handling equipment, waste management equipment, and/or the like). As described herein, engine 100 may provide power to a generator (e.g., for electrical alternating current (AC) power generation).

Engine 100 may include an engine block 102. Engine block 102 may include one or more cylinders (not shown) provided therein. The cylinders may be arranged in any configuration, such as inline, radial, "V", and so on. Engine 100 further may include a piston (not shown) movably disposed within each of the cylinders. Each of the pistons may be coupled to an engine output 104 (e.g., a crankshaft) of engine 100. Energy generated from combustion of the fuel inside the cylinders may be converted to rotational energy of engine output 104 by the pistons. As described herein, a generator may be positioned in line with engine 100 (e.g., within a fixed position defined by a support structure (e.g., a frame, one or more fixed brackets, and/or the like) of a power system.

Engine 100 may include a cylinder head 106 mounted on the engine block 102. Cylinder head 106 may house one or more components and/or systems of engine 100 such as a valve train, an intake manifold, an exhaust manifold, sensors, and so on. Engine 100 may include various other components and/or systems (not shown) such as a crankcase, a fuel system, an air system, a cooling system, a turbocharger, an exhaust gas recirculation system, an exhaust gas aftertreatment system, other peripherals, and so on.

As indicated above, FIG. 1 is provided as an example. Other examples may differ from what is described in connection with FIG. 1.

Figure 2:
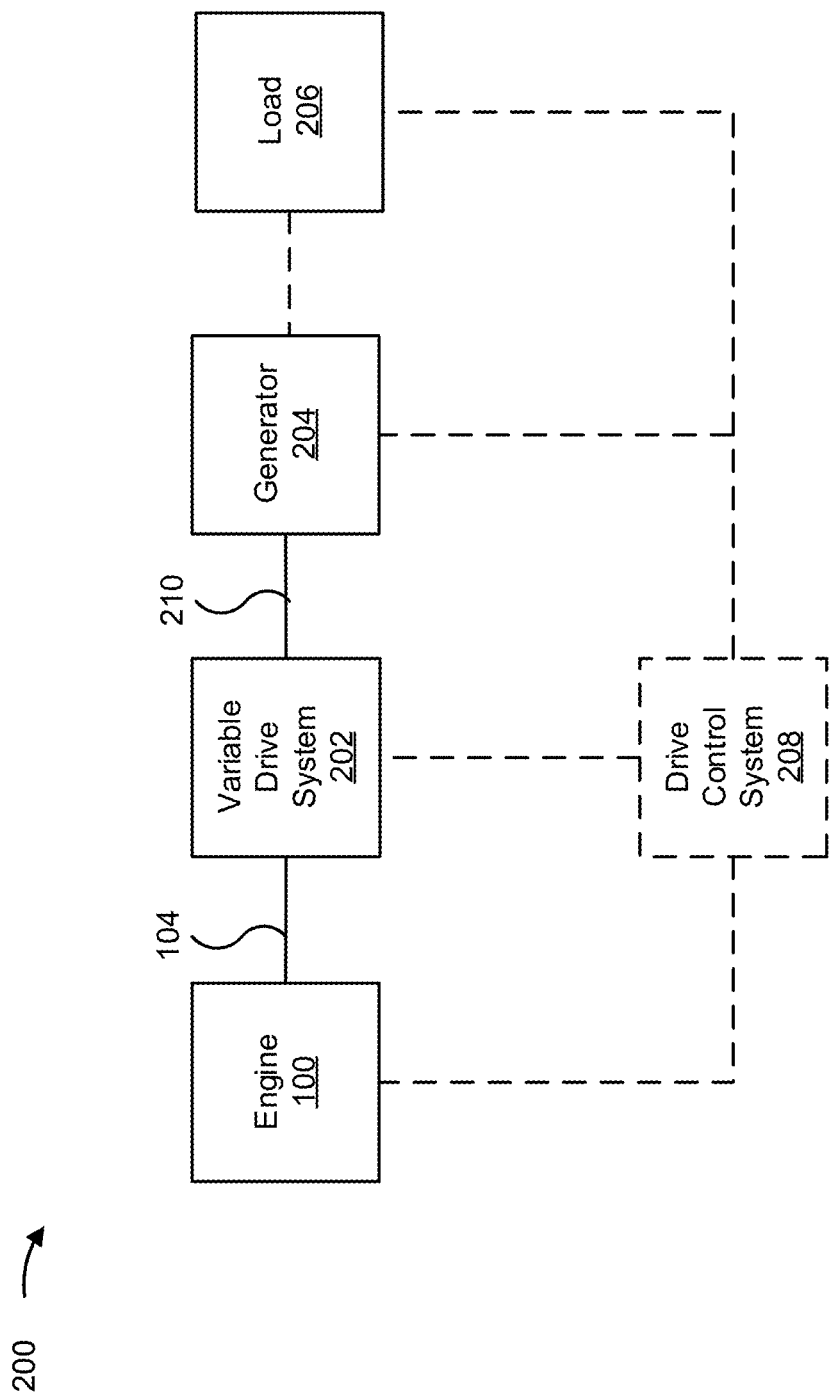
FIG. 2 is a diagram of an example implementation of a power system described herein.

FIG. 2 is a diagram of an example implementation of a power system 200 described herein. Power system 200 of FIG. 2 includes an engine 100 (which may correspond to engine 100 of FIG. 1), a variable drive system 202, a generator 204, a load 206, and a drive control system 208. Engine 100, variable drive system 202, and generator 204 may be mechanically coupled to each other (as shown by respective solid lines). Generator 204 and load 206 may be electrically coupled to each other, and drive control system 208 may be mechanically, electrically, and/or hydraulically connected to engine 100, variable drive system 202, generator 204, and/or load 206. As used herein, components are "mechanically coupled" when the components are attached to (e.g., fastened to via one or more fasteners or couplings, fit to, adhered to, and/or the like) each other directly (without any intervening components other than fasteners or couplings) or attached to each other via one or more intervening parts. Further, as used herein, components are "mechanically connected" when the components are attached to each other without any intervening components (other than fasteners or couplings).

As described herein, power system 200 is used to generate electrical power by transferring power from engine 100 to generator 204 (e.g., to enable AC power at a site or building that does not have access to grid power). In some implementations, power system 200 may be included within a marine vessel (e.g., in an engine room of the marine vessel). As described herein, variable drive system 202 may control a transfer of power from engine 100 to generator 204.

Variable drive system 202 may include a variable drive (e.g., a continuously variable transmission (CVT), a mechanical adjustable speed drive, a hydraulic adjustable speed drive, a hydraulic parallel path variable transmission, a hydrostatic drive, and/or the like). The variable drive may include a first variable pulley (e.g., a primary drive of a CVT), a second variable pulley (e.g., a secondary drive of a CVT), and a drive element (e.g., a belt, a cable, a chain, and/or the like) coupled to the first variable pulley and the second variable pulley. As described herein, variable drive system 202 may include one or more clutches to enable or control transfer of power through power system 200. Additionally, or alternatively, variable drive system 202 may include one or more fixed gear drives with one or more fixed gears.

Generator 204 may be any suitable generator configured to convert mechanical energy to electrical energy. For example, generator 204 may include a stator and a rotor that is coupled to a generator driveshaft 210. The generator driveshaft 210 may rotate the rotor, which produces a magnetic field. The stator of generator 204 may produce AC power (e.g., via induction) from the magnetic field. A frequency of the AC power may be based on the rotational speed of the rotor. For example, the faster the rotational speed of generator driveshaft 210, the higher the frequency of the AC power to load 206, and the lower the rotational speed of generator driveshaft 210, the lower the frequency of the AC power to load 206. Load 206 may be one or more devices powered by AC power (e.g., AC power that is a particular frequency, such as 50 Hertz (Hz), 60 Hz, and/or the like).

Drive control system 208 includes one or more devices (e.g., electrical components, hydraulic components, and/or the like) or systems (e.g., electrical systems, hydraulic systems, and/or the like) for receiving information (e.g., speed information, position information, settings, and/or the like) from one or more components of power system 200, and/or controlling one or more components of power system 200. For example, as shown by the dashed lines, drive control system 208 may utilize electrical signals and/or hydraulics to communicate with and/or control engine 100, variable drive system 202, and/or generator 204.

Electrical components of drive control system 208 are implemented in hardware, firmware, or a combination of hardware and software. For example, one or more electrical components of drive control system 208 are implemented as a processor, such as a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. Drive control system 208 may include one or more processors capable of being programmed to perform a function. In some implementations, one or more memories associated with drive control system 208, including an electrically erasable programmable read-only memory (EEPROM)), a random access memory (RAM), a read only memory (ROM), and/or another type of dynamic or static storage device (e.g., a flash memory, a magnetic memory, optical memory, and/or the like) may store information and/or instructions for use by drive control system 208.

Drive control system 208 may be configured with mapping information associated with controlling one or more components of power system 200, such as variable drive system 202. Drive control system 208 may store the mapping information in the one or more memories. The mapping information may include information associated with statuses of components of power system 200 and corresponding operating modes of the power system 200, processes, and/or actions that are to be performed by variable drive system 202 (e.g., adjustments to a gear ratio of a variable drive of variable drive system 202, adjustments to one or more clutches of variable drive system 202, and/or the like). In some implementations, drive control system 208 may be configured with the mapping information during a manufacturing process, a calibration process associated with variable drive system 202, a setup process associated with variable drive system 202, and/or the like.

Drive control system 208 may receive one or more inputs (e.g., electrical inputs, hydraulic inputs, mechanical inputs and/or the like) from one or more components of power system 200, from one or more sensors associated with the components of power system 200, from one or more operator control devices associated with power system 200 (e.g., an electronic user interface of an operator station of the machine, a mechanical implement of the operator station, and/or the like) and/or the like. Further, drive control system 208 may provide an output to variable drive system 202 (and/or one or more other components of power system 200) based on the one or more inputs. For example, drive control system 208 may be configured to determine an operating mode of power system 200, based on one or more inputs providing information associated with the components of power system 200. As described herein, such operating modes may be a desired speed of engine output 104 and/or a desired speed of generator driveshaft 210 (and/or a corresponding frequency of AC power for load 206). In some implementations, drive control system 208 may receive load information (e.g., an amount of resistance of load 206) to permit drive control system 208 to correspondingly control variable drive system 202 and/or a speed of engine 100. Additionally, or alternatively, drive control system 208 may be configured to automatically determine a frequency requirement of load 206 (e.g., based on being communicatively coupled with a device (e.g., a communication device) of load 206 and/or information received from load 206).

Power system 200 may include one more other components not shown in FIG. 2. For example, power system 200 may include one or more flywheels (or other types of kinetic storage devices) to accept step loads and/or assist with accelerating (or decelerating) engine 100 when switching between power modes and/or engine speeds. Accordingly, a flywheel may be communicatively coupled with engine output 104, variable drive system 202, and/or generator driveshaft 210. Additionally, or alternatively, power system 200 may include an AC motor to maintain a speed of the flywheel (e.g., to keep the flywheel charged with kinetic energy). In such cases, the AC motor may be included within or be a part of load 206. Moreover, as described herein, power system 200 may include one or more clutches that can be engaged and/or disengaged to enable the transfer of power between components of power system 200. In some implementations, power system 200 may include one or more pumps. For example, power system 200 may include a hydraulic pump to control hydraulic components of power system 200, such as one or more clutches, one or more variable drives, and/or the like. Additionally, or alternatively, power system 200 may include one or more pumps for lubrication (e.g., to lubricate clutches, supplying lubricant to cylinders of engine 100, and/or the like) and/or one or more pumps to supply fuel to engine 100.

As indicated above, FIG. 2 is provided as an example. Other examples may differ from what is described in connection with FIG. 2.

Figure 3:
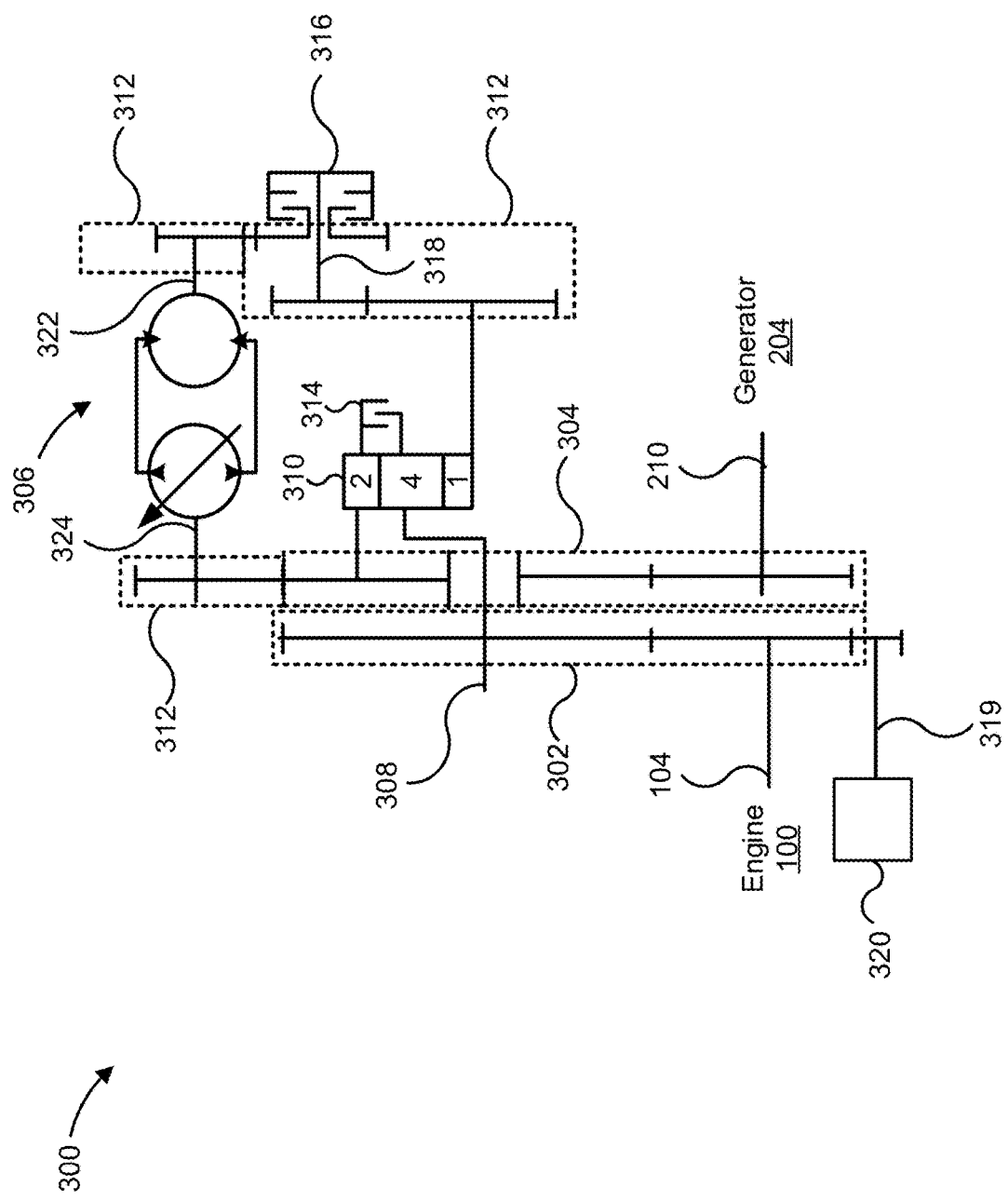
FIGS. 3 and 4 are diagrams of one or more example implementations of a variable drive system of the example power system of FIG. 2.

FIG. 3 is a diagram of an example implementation of variable drive system 202 (referred to herein as "variable drive system 300") of power system 200 of FIG. 2. In FIG. 3, variable drive system 300 includes an engine gearset 302, a generator gearset 304, and a variable drive 306. As shown, engine gearset 302 is mechanically coupled to a variable input driveshaft 308 that is mechanically coupled to a fixed gear drive 310. Though fixed gear drive 310 is shown as a planetary gear drive (e.g., with planetary gear trains), fixed gear drive 310 may utilize any other type of fixed gear system (e.g., one or more countershaft gear trains). Variable drive 306 is mechanically coupled to variable input driveshaft 308 and generator gearset 304 via a variable drive gearset 312.

As further shown in FIG. 3, variable drive system 300 includes a direct drive clutch 314. When engaged, direct drive clutch 314 enables engine output 104 to directly transfer power to generator driveshaft 210 by bypassing variable drive 306. As shown in FIG. 3, direct drive clutch 314 is positioned toward a generator side of fixed gear drive 310 (e.g., to enable improved oil routing for direct drive clutch 314). In other examples, direct drive clutch 314 may be positioned toward an engine side of fixed gear drive 310. For example, direct drive clutch 314 may be mechanically coupled between fixed gear drive 310 and generator gearset 304.

Additionally, or alternatively, variable drive system 300 may include a motor drive clutch 316. Motor drive clutch 316 may be mechanically coupled to a motor idler shaft 318 that is mechanically coupled to engine gearset 302. A charge pump driveshaft 319 may supply power from engine gearset 302 (e.g., via a gear mechanically coupled with engine gearset 302) to charge pump 320, which may be a hydraulics pump (e.g., for hydraulics associated with variable drive 306), a lubricant pump (e.g., for lubricating direct drive clutch 314, motor drive clutch 316, engine 100, and/or the like). Motor drive clutch 316 may be mechanically coupled to motor idler shaft 318 between variable drive 306 and variable input driveshaft 308. Though shown on a generator side of variable drive 306, in other examples, motor drive clutch 316 may be mechanically coupled between variable drive 306 and generator gearset 304 toward an engine side of power system 200 (e.g., to reduce a length of routings for hydraulics fluid associated with a pump of charge pump 320).

As described herein, when a clutch is "engaged," the clutch may be "partially engaged" to allow the clutch to slip or "fully engaged," which does not allow the clutch to slip. A clutch may slip when an amount of pressure applied between clutch plates of the clutch does not provide enough friction (which may depend on the coefficient of friction of the clutch plates) to cause the clutch plates of the clutch to co-rotate or have a same rotational speed.

Fixed gear drive 310 may be configured to maintain a speed of engine output 104 when transferring power directly to generator driveshaft 210 via the engagement of direct drive clutch 314. For example, if the gear ratios of engine gearset 302 and generator gearset 304 are the same (e.g., gears of engine gearset 302 and generator gearset 304 are correspondingly the same (e.g., same diameter, same type, same configuration, and/or the like)), and engine output 104 has a rotational speed of 1800 revolutions per minute (RPM), generator driveshaft 210 may correspondingly have a rotational speed of 1800 RPM (e.g., to achieve AC power at a frequency of 60 Hz).

According to some implementations, fixed gear drive 310 may be configured to step down rotational speed of engine output 104 to generator driveshaft 210 when direct drive clutch 314 is engaged according to gear ratios of engine gearset 302 and generator gearset 304, as described herein. For example, for certain gear ratios of engine gearset 302 and generator gearset 304, when engine output 104 has a rotational speed of 1800 RPM, generator driveshaft 210 may have a speed of 1500 RPM (e.g., to achieve AC power at a frequency of 50 Hz). Additionally, or alternatively, for certain gear ratios of engine gearset 302 and generator gearset 304, when engine output 104 has a rotational speed of over 2100 RPM, generator driveshaft 210 may have a speed of 1800 RPM (e.g., to achieve AC power at a frequency of 60 Hz).

As shown in FIG. 3, variable drive 306 may be an inline variable drive. For example, a variable output 322 of variable drive 306 may be aligned with a variable input 324 of variable drive 306. Such a configuration may enable a relatively simplified oil system packaging around fixed gear drive 310 and/or variable drive gearset 312.

Furthermore, in the example of FIG. 3, variable drive 306 and/or variable input driveshaft 308 are offset from engine 100 and generator 204. For example, engine gearset 302 and generator gearset 304 may be configured to enable variable drive 306 to be lifted above, below, or to either side of engine 100 and generator 204 (rather than be between engine 100 and generator 204, as in previous techniques). In this way, engine 100 and generator 204 may be positioned closer together to reduce an axial length of power system 200 relative to having variable drive 306 situated in a space between engine 100 and generator 204. For example, a total axial length of power system 200 may be confined to a particular length of a structure, frame, and/or room (e.g., an engine room of a marine vessel). Therefore, variable drive system 300 may permit power system 200 to fit within a frame or compartment (e.g., an engine room, an engine housing, and/or the like) that may not otherwise be possible without the mechanical configuration of a power system 200 that enables variable drive system 202 to be offset from engine 100 and generator 204 using engine gearset 302 and generator gearset 304.

As indicated above, FIG. 3 is provided as an example. Other examples may differ from what is described in connection with FIG. 3.

Figure 4:
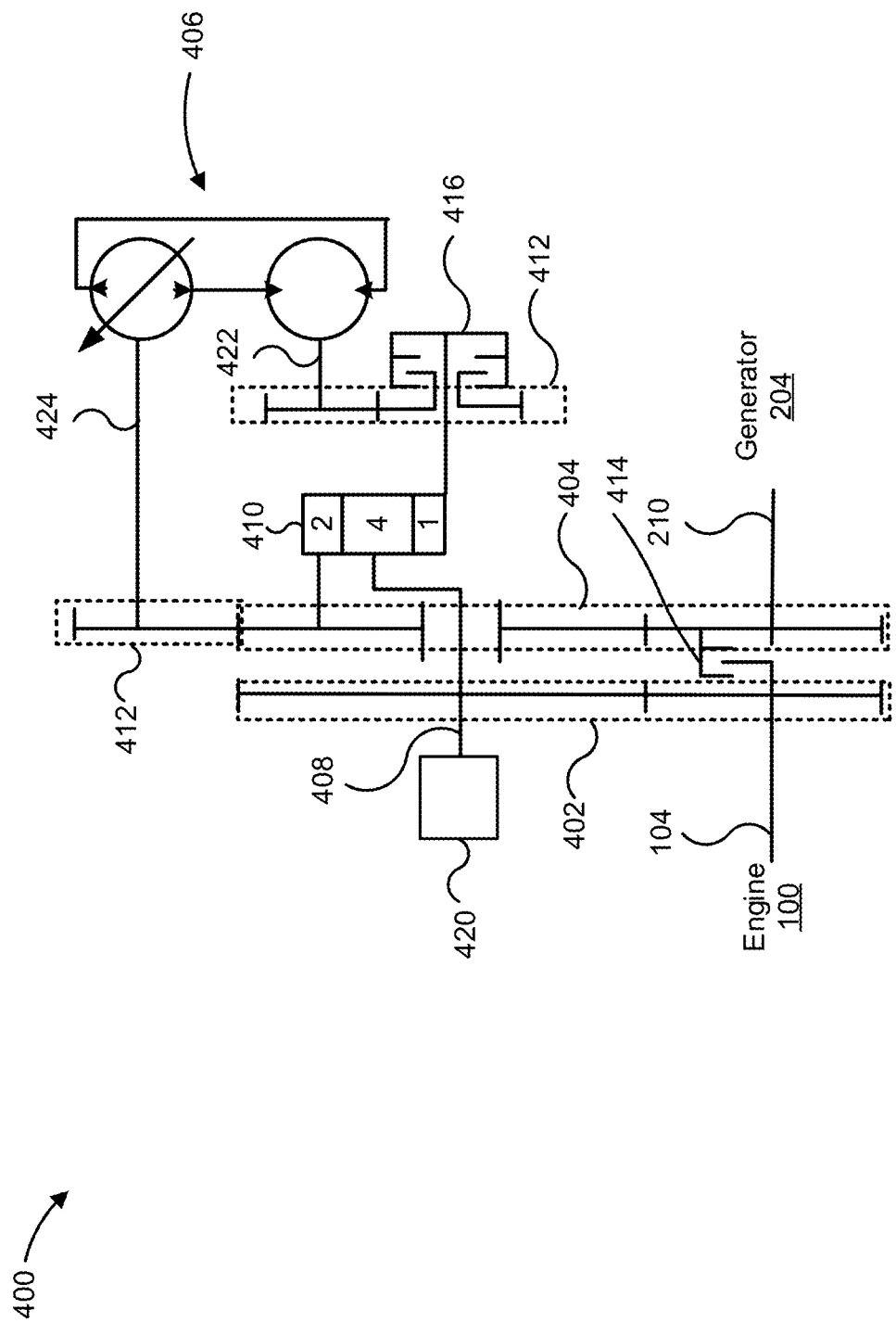

FIG. 4 is a diagram of an example implementation of variable drive system 202 (referred to herein as "variable drive system 400") of the example power system 200 of FIG. 2. In FIG. 4, variable drive system 400 includes an engine gearset 402, a generator gearset 404, and a variable drive 406. As shown, engine gearset 402 is mechanically coupled to a variable input driveshaft 408 that is mechanically coupled to a fixed gear drive 410 (e.g., shown as a planetary drive, though other types of fixed gear system may be utilized). Variable drive 406 is mechanically coupled to variable input driveshaft 408 and generator gearset 404 via a variable drive gearset 312.

As further shown in FIG. 4, variable drive system 400 includes a direct drive clutch 414. When engaged, direct drive clutch 414 enables engine output 104 to directly transfer power to generator driveshaft 210 by bypassing variable drive 406. As shown in FIG. 4, direct drive clutch 414 is mechanically connected to engine output 104 and generator driveshaft 210. In this position, direct drive clutch 414, when engaged, enables minimal or near zero parasitic power loss (e.g., because direct drive clutch 414 is the only component between engine output 104 and generator driveshaft 210) and enables the speed of engine output 104 to be the same as the speed of generator driveshaft 210 (e.g., when direct drive clutch 414 is fully engaged). Accordingly, in the example of FIG. 4, gears of engine gearset 402 may be the same configuration as the gears in generator gearset 404 (e.g., to ensure that the speed of engine output 104 is the same as the speed of generator driveshaft 210).

Additionally, or alternatively, variable drive system 400 may include a motor drive clutch 416. Motor drive clutch 416 may be enable power to transfer to a charge pump 420 mechanically coupled to variable input driveshaft 408. Similar to charge pump 320 of FIG. 3, charge pump 420 may be a motor of a pump. Motor drive clutch 416 may be mechanically coupled between variable drive 406 and variable input driveshaft 408.

As shown in FIG. 4, variable drive 406 may be a U-shaped variator. For example, a variable output 422 of variable drive 406 may be parallel with a variable input 424 of variable drive 406. Such a configuration of variable drive system 400 may eliminate the need for a motor idler shaft (e.g., motor idler shaft 318 of variable drive system 300). Furthermore, the configuration of variable drive system 400 may allow for improved external serviceability of variable drive 406 and/or a reduced axial length of power system 200 (e.g., relative to serviceability of variable drive 306 of variable drive system 300). Although fixed gear drive 410 is shown in a position that is between gears of variable gearset 412, fixed gear drive 410 may be positioned toward an engine side of all gears of variable gearset 412 (e.g., so that variable output 424 does not extend over fixed gear drive 410). For example, rather than variable output 424 being mechanically connected to a gear of variable gearset 412 that is mechanically connected to generator gearset 404, variable output 424 may be mechanically connected to gears of variable gearset 412 that are mechanically connected to fixed gear drive 410, such that fixed gear drive 410 is mechanically connected between multiple gears of variable gearset 412 and generator gearset 404.

As indicated above, FIG. 4 is provided as an example. Other examples may differ from what is described in connection with FIG. 4.

FIG. 5 is a diagram of one or example implementations of gearsets of variable drive system 202 of the example power system 200 (referred to herein as "variable drive system 500") of FIG. 2. In the example of FIG. 5, examples of engine gearsets 502a to 502d (referred to individually as a "engine gearset 502" and collectively as "engine gearsets 502") (which may correspond to engine gearset 302 and/or engine gearset 402) and generator gearsets 504a to 504d (which may correspond to generator gearsets 304 and/or generator gearset 404). Engine gearsets 502 include a first fixed gear ("1") and a second fixed gear. The first fixed gear is mechanically coupled to an engine output of variable drive system 500, and the second fixed gear ("2") is driven by the first fixed gear and is mechanically coupled to a variable driveshaft 508 of variable drive system 500. Generator gearsets 504 include a third fixed gear ("3") and a fourth fixed gear ("4"). The first fixed gear, the second fixed gear, the third fixed gear, and the fourth fixed gear may be referred to collectively herein as "the gears."

In the example implementations of FIG. 5, each of the gears is one of an intermediate gear (A), a high gear (B), or a low gear (C). A gear ratio between the example high gear and the example low gear (corresponding to a ratio of a diameter of the high gear and a diameter of the low gear) may be approximately 0.833. Other gear ratios may be possible depending on the type of engine 100 and/or the type of generator 204. The respective diameters of the intermediate gear, the high gear, and the low gear may be configured and/or dependent on fixed positions of engine 100 and/or generator 204 within a frame and/or compartment of power system 200.

In a first implementation of variable drive system 500, the first fixed gear and the second fixed gear of engine gearset 502a, and the third fixed gear and the fourth fixed gear of generator gearset 504a, are each an intermediate fixed gear. In such a configuration, variable drive system 500 may provide a speed of the engine output 104 that is the same as a speed of the generator driveshaft 210 (e.g., when a direct drive clutch is to be engaged to bypass power transfer through the variable drive). For example, as shown, the speeds of the first fixed gear, the second fixed gear, the third fixed gear, and the fourth fixed gear may all be 1800 RPM (e.g., to achieve 60 Hz electrical output via the generator).

In a second implementation of variable drive system 500, the first fixed gear and the second fixed gear of engine gearset 502b are each an intermediate fixed gear, the third fixed gear of generator gearset 504b is a high fixed gear, and the fourth fixed gear of generator gearset 504b is a low fixed gear. In such a configuration, variable drive system 500 may provide a speed of engine output 104 that is greater than a speed of generator driveshaft 210 (e.g., when a direct drive clutch is to be engaged to bypass power transfer through the variable drive). For example, as shown, the speeds of the first fixed gear, the second fixed gear, and the third fixed gear may be 1800 RPM, and the speed of the fourth fixed gear may be 1500 RPM (e.g., to achieve 50 Hz electrical output via the generator).

In a third implementation of variable drive system 500, the first fixed gear of engine gearset 502c is a high fixed gear, the second fixed gear of engine gearset 502c is a low fixed gear, and the third fixed gear and the fourth fixed gear of generator gearset 504c are each an intermediate fixed gear. In such a configuration, variable drive system 500 may provide a speed of engine output 104 that is greater than a speed of generator driveshaft 210 (e.g., when a direct drive clutch is to be engaged to bypass power transfer through the variable drive). For example, as shown, the speed of the first gear may be 2160 RPM and the speeds of the second fixed gear, the third fixed gear, and the fourth fixed gear may be 1800 RPM (e.g., to achieve 60 Hz electrical output via the generator).

In a fourth implementation of variable drive system 500, the first fixed gear of engine gearset 502d and the third fixed gear of generator gearset 504d are each a high fixed gear, and the second fixed gear of engine gearset 502d and fourth fixed gear of generator gearset 504d are each a low fixed gear. In such a configuration, variable drive system 500 may provide a speed of engine output 104 that is greater than a speed of generator driveshaft 210 (e.g., when a direct drive clutch is to be engaged to bypass power transfer through the variable drive). For example, as shown, the speed of the first gear may be 2160 RPM, the speed of the second gear and the third gear may be 1800 RPM, and the speed of the fourth gear may be 1500 RPM (e.g., to achieve 50 Hz electrical output via the generator).

Accordingly, the example implementations of engine gearsets 502 and generator gearsets 504 enable at least four different fixed gear ratios using three of the same gears to provide the same performance characteristics of variable drive system 500 depending on the type of the engine (e.g., the speed at which engine output 104 is to rotate) and/or the type of the type of the generator (e.g., the speed at which generator driveshaft 210 is to rotate and/or the frequency of electrical output from the generator). Therefore, gears of engine gearset 502 and gears of generator gearset 504 are interchangeable between three particular fixed gears (the low gear, the intermediate gear, and the high gear) based on a particular speed of engine output 104 and a desired speed of generator driveshaft 210.

As indicated above, FIG. 5 is provided as an example. Other examples may differ from what is described in connection with FIG. 5.

FIG. 6 is a diagram illustrating one or more example implementations of power system 200 of FIG. 2. As shown in FIG. 6, a first power system 600a is shown with a first variable drive system 602a, and a second power system 600b is shown with a second variable drive system 602b. Both the first power system 600a and the second power system 600b may include engine 100 and generator 204.

As shown in FIG. 6, first variable drive system 602a of first power system 600a is positioned in a space between engine 100 and generator 204, while the second variable drive system 602b of second power system 600b is offset from engine 100a and generator 204 to enable the overall axial length of second power system 600b to be reduced relative to the first power system 600a (e.g., because an axial length of the second variable drive system 602b may overlap a portion of the axial length of generator 204). In this way, second variable drive system 602b (which may correspond to variable drive system 202, variable drive system 300, variable drive system 400, variable drive system 500, and/or the like) can be offset from engine 100 and/or generator 204 to reduce an effect on the overall axial length of second power system 600b. In some implementations, a distance between generator 204 (e.g., an input end of generator 204 from which generator driveshaft 210 extends) and engine 100 (e.g., an output end of engine 100 from which engine output 104 extends) may be less than a threshold distance (e.g., a distance that corresponds to less than a threshold percentage (e.g., less than 10%, less than 20%, and/or the like) of the axial length of the power system).

As indicated above, FIG. 6 is provided as an example. Other examples may differ from what is described in connection with FIG. 6.

INDUSTRIAL APPLICABILITY

The disclosed example implementations of variable drive system 202 are configured to maintain a rotational speed of generator driveshaft 210 (e.g., to ensure that generator 204 provides electrical power at a particular output frequency (e.g., 50 Hz, 60 Hz, and/or the like). Moreover, variable drive system 202 may be configured to prevent engine 100 from stalling (by using and controlling a gear ratio of a variable drive) as loads of generator 204 change and a speed of engine output 104 is to correspondingly be increased.

Moreover, variable drive system 202 may be configured to conserve fuel relative to previous techniques by reducing a quantity and/or volume of components between engine 100 and generator 204 that cause loss of power (e.g., due to parasitic penalties of otherwise included components in previous techniques). For example, under a high load, a direct drive clutch of variable drive system 202 may be engaged to bypass power transfer through one or more components (e.g., a variable drive) of variable drive system 202, thus reducing the number of components mechanically coupled between engine 100 and generator 204.

Moreover, variable drive system 202 may be configured from a limited number of interchangeable components. For example, variable drive system 202 may permit a same set of performance characteristics to be achieved using a limited set of gear sizes (e.g., three gear sizes for a low gear, a high gear, and an intermediate gear). As described herein, variable drive system 202 may be configured with at least four different configurations of a same set of three gears depending on the type of engine used and/or output required from a generator. Therefore, the three sets of interchangeable gears may enable engine 100 and 204 to be mounted within a same designed frame or compartment, but allow for different speeds of engine output 104 and/or generator driveshaft 210. In this way, requirements for custom design, creation, and manufacturing of gearsets and/or other components of power system 200 may be reduced when given a fixed frame and/or compartment for power system 200 that is to be uniform across a plurality of different implementations or uses.

Moreover, variable drive system 202 may be configured to reduce an overall length of power system 200, to permit power system 200 to be inserted into relatively confined frames and/or compartments (e.g., engine rooms of a marine vessel). In this way, hardware, components, and/or costs used to design and/or generate such frames and/or components may correspondingly be reduced. Variable drive system 202 may allow for improved design and/or access to components of parts (e.g., a variable drive of variable drive system 202), relative to previous techniques, that correspondingly enhance maintenance capabilities and/or reduces costs (e.g., financial costs, labor costs, and/or the like) with respect to maintaining components of variable drive system 202.

What is claimed is:

1. A power system, comprising:
an engine;
a generator aligned with the engine along an axial length of the power system; and
a variable drive system comprising:
an engine gearset to transfer power from an engine output of the engine to a variable input driveshaft of the variable drive system,
wherein the engine gearset comprises a first fixed gear and a second fixed gear;
a generator gearset to transfer power, generated by the engine, to a generator driveshaft of the generator,
wherein the generator gearset comprises a third fixed gear and a fourth fixed gear, and
wherein the first fixed gear, the second fixed gear, the third fixed gear, and the fourth fixed gear are intermediate fixed gears that are configured to enable a speed of the engine output to be a same as a speed of the generator driveshaft when a direct drive clutch is to be engaged; and
a variable drive offset from the engine and the generator by being mechanically coupled between the engine gearset and the generator gearset to enable the axial length of the power system to satisfy a threshold length.

2. The power system of claim 1, wherein the variable drive system further comprises the direct drive clutch to bypass variable power transfer through the variable drive and enable direct power transfer from the engine output to the generator driveshaft.

3. The power system of claim 2, wherein the variable drive system further comprises a motor drive clutch to disengage a hydraulic pump to prevent power transfer to the hydraulic pump.

4. The power system of claim 1, wherein the variable drive comprises one of:
a continuously variable transmission, or
a hydraulic parallel path variable transmission.

5. The power system of claim 1, wherein the engine gearset and the generator gearset are positioned to be adjacent one another and between the engine and the generator.

6. The power system of claim 1, wherein the variable drive is offset from the engine and the generator to reduce an effect on the axial length of the power system.

7. A gearset assembly, comprising:
an engine gearset that is mechanically coupled to an engine output of an engine and is mechanically coupled to a variable driveshaft associated with a variable drive,
wherein the engine gearset comprises a first fixed gear and a second fixed gear; and
a generator gearset, mechanically coupled to a generator driveshaft of a generator, to transfer power, generated by the engine, to the generator driveshaft,
wherein the generator gearset comprises a third fixed gear and a fourth fixed gear, and
wherein the first fixed gear, the second fixed gear, the third fixed gear, and the fourth fixed gear are intermediate fixed gears that are configured to enable a speed of the engine output to be a same as a speed of the generator driveshaft when a direct drive clutch is to be engaged to bypass power transfer through the variable drive.

8. The gearset assembly of claim 7,
wherein respective diameters of the first fixed gear, the second fixed gear, and the third fixed gear are based on fixed positions of the engine and the generator.

9. The gearset assembly of claim 7, wherein the engine gearset and the generator gearset provide a fixed gear ratio between the engine output and the generator driveshaft in a manner that prevents power loss caused by the variable drive.

10. The gearset assembly of claim 7, wherein the engine gearset and the generator gearset are positioned to be adjacent one another, and between the engine and the generator, to permit the variable drive to be offset from the engine and the generator.

11. The gearset assembly of claim 7, wherein the first fixed gear is mechanically coupled to the engine output, and
wherein the second fixed gear is driven by the first fixed gear and is mechanically coupled to the variable driveshaft.

12. The gearset assembly of claim 7,
wherein the third fixed gear is driven by a fixed gear drive, and
wherein the fourth fixed gear is driven by the third fixed gear and is mechanically coupled to the generator driveshaft.

13. The gearset assembly of claim 7, wherein the variable drive is mechanically coupled in a power system between the engine and the generator.

14. A variable drive system comprising:
an engine gearset to transfer power from an engine output of an engine to a variable input driveshaft of the variable drive system,
wherein the engine gearset comprises a first fixed gear and a second fixed gear;
a generator gearset to transfer power, generated by the engine, to a generator driveshaft of a generator,
wherein the generator gearset comprises a third fixed gear and a fourth fixed gear, and
wherein the first fixed gear, the second fixed gear, the third fixed gear, and the fourth fixed gear are intermediate fixed gears that are configured to enable a speed of the engine output to be same as a speed of the generator driveshaft when a direct drive clutch is to be engaged; and a variable drive offset from the engine and the generator by being mechanically coupled between the engine gearset and the generator gearset.

15. The variable drive system of claim 14, wherein the first fixed gear is mechanically coupled to the engine output.

16. The variable drive system of claim 14, wherein the second fixed gear is driven by the first fixed gear.

17. The variable drive system of claim 14, wherein the third fixed gear is driven by a fixed gear drive.

18. The variable drive system of claim 14, wherein the fourth fixed gear is driven by the third fixed gear.

19. The variable drive system of claim 14, wherein the fourth fixed gear is mechanically coupled to the generator driveshaft.

20. The variable drive system of claim 14, wherein the engine gearset and the generator gearset are positioned to be adjacent one another.

\* \* \* \* \*